(12) United States Patent
Kote

(10) Patent No.: US 10,937,023 B2
(45) Date of Patent: Mar. 2, 2021

(54) CRYPTO CURRENCY CHARGEBACK SYSTEM

(71) Applicant: PAYPAL, INC., San Jose, CA (US)

(72) Inventor: Yashovardhana S. Kote, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 808 days.

(21) Appl. No.: 14/984,981

(22) Filed: Dec. 30, 2015

(65) Prior Publication Data

US 2017/0109734 A1 Apr. 20, 2017

Related U.S. Application Data

(60) Provisional application No. 62/242,065, filed on Oct. 15, 2015.

(51) Int. Cl.
*G06Q 20/00* (2012.01)
*G06Q 20/38* (2012.01)
*G06Q 40/00* (2012.01)
*G06Q 20/06* (2012.01)
*G06Q 20/40* (2012.01)

(52) U.S. Cl.
CPC ......... *G06Q 20/382* (2013.01); *G06Q 20/065* (2013.01); *G06Q 20/401* (2013.01); *G06Q 40/12* (2013.12)

(58) Field of Classification Search
CPC .............................. G06Q 20/382; G06Q 40/12
USPC .......................................................... 705/68
See application file for complete search history.

(56) References Cited

U.S. PATENT DOCUMENTS

| | | | |
|---|---|---|---|
| 9,595,034 B2* | 3/2017 | Van Rooyen | G06Q 20/3829 |
| 9,996,834 B2* | 6/2018 | Powell | G06Q 20/381 |
| 2015/0161690 A1* | 6/2015 | Collendavelloo | G06Q 30/04 705/30 |
| 2015/0348017 A1 | 12/2015 | Allmen | |
| 2015/0356555 A1* | 12/2015 | Pennanen | G06Q 20/06 705/71 |
| 2015/0363783 A1* | 12/2015 | Ronca | G06Q 20/4016 705/71 |

OTHER PUBLICATIONS

"Dispute Resolution In OpenBazaar—GitHub, Dispute Resolution in OpenBazaar," 2015, GitHub, Inc., pp. 1-8, https://gist.github.com/drwasho/405d51bd1b1a32e38145.

* cited by examiner

*Primary Examiner* — Patrick McAtee
*Assistant Examiner* — John M Winter
(74) *Attorney, Agent, or Firm* — Haynes and Boone, LLP

(57) ABSTRACT

Distributed crypto currency chargeback systems and methods include at least one system provider device receiving, through a network from a payer device associated with a payer, a chargeback report associated with a first transaction of a plurality of transactions performed using a distributed crypto currency, where the first transaction involves the payer and a payee. The at least one system provider device publishes the chargeback report in a chargeback ledger. The at least one system provider device receives, through the network from a payee device associated with the payee subsequent to publishing the chargeback ledger including the chargeback report, a chargeback response associated with the first transaction. The at least one system provider device then publishes the chargeback response in the chargeback ledger.

20 Claims, 13 Drawing Sheets

| TRANSACTION ID 602 | FROM 604 | TO 606 | AMOUNT 608 | CHARGEBACK STATUS 610 | REFUND TRANSACTION ID 612 |
|---|---|---|---|---|---|
| 123456789 | PAYER ID | PAYEE ID | 1.34 | | |

| TRANSACTION ID 602 | FROM 604 | TO 606 | AMOUNT 608 | CHARGEBACK STATUS 610 | REFUND TRANSACTION ID 612 |
|---|---|---|---|---|---|
| 123456789 | PAYER ID | PAYEE ID | 1.34 | OPENED | |

| TRANSACTION ID 602 | FROM 604 | TO 606 | AMOUNT 608 | CHARGEBACK STATUS 610 | REFUND TRANSACTION ID 612 |
|---|---|---|---|---|---|
| 123456789 | PAYER ID | PAYEE ID | 1.34 | REFUNDED | 987654321 |

| TRANSACTION ID 602 | FROM 604 | TO 606 | AMOUNT 608 | CHARGEBACK STATUS 610 | REFUND TRANSACTION ID 612 |
|---|---|---|---|---|---|
| 123456789 | PAYER ID | PAYEE ID | 1.34 | SHIPPED | |

CRYPTO CURRENCY CHARGEBACK SYSTEM

CROSS-REFERENCE TO RELATED APPLICATIONS

This application claims priority to U.S. Provisional Application Ser. No. 62/242,065, filed Oct. 15, 2015, entitled "System For Enabling Chargebacks In Cryptocurrencies," Attorney Docket No. 70481.485PV01, the disclosure of which is incorporated herein by reference in its entirety.

BACKGROUND

Field of the Invention

The present invention generally relates to online and/or mobile payments and more particularly to a chargeback system for distributed crypto currencies that may be used in online and/or mobile payments.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Conventional payment service providers typically provide for payment by a payer to a payee through the use of payer accounts of the payer (e.g., credit accounts, banking account, and/or a variety of other payer accounts that may be provided by an account provider). For example, the payment service provider may provide a payment service account to the payer, and the payer may link one or more payer accounts to the payment service account (or the payment service account may include a payer account provided by the payment service provider). In a transaction between the payer and the payee, the payment service provider may then transfer funds from one of the payer accounts to a payee account of the payee (which may also be provided by the account providers or payment service provider). In transactions between payers and payees, transaction risk associated with the transaction is typically borne by the payee in the form of "chargebacks" by the account provider or payment service provider (i.e., a reversal of a fund transfer from the payer account to the payee account).

An alternative to the payer accounts and payee accounts provided by account providers, discussed above, is the use of distributed crypto currencies such as, for example, Bitcoin. Distributed crypto currencies are not controlled by any central authority, but rather by a distributed network of computing devices that operate to confirm transfers of the crypto currency between payers and payees. Such decentralized distributed crypto currencies conventionally provide for the non-reversible transfer of the crypto currency between users in the system, as there is no central authority that mediates disputes associated with the transfer of the crypto currency between users. In other words, once a transfer has been made from a payer to a payee, there is no way to reverse that transfer unless the payee decides to transfer the crypto currency back to the payer in a new transaction. This feature of distributed crypto currencies provides a number of benefits (e.g., reduced transaction costs), but places the transaction risk on the payer. For example, if the payee does not deliver on a promise of goods or services, or such goods or services are deficient, the payer may have no recourse if the payee will not agree to provide a refund. Such limitations have slowed the adoption of crypto currencies in commercial transactions to payers willing to bear the risks discussed above.

Thus, there is a need for an improved distributed crypto currency system.

BRIEF DESCRIPTION OF THE FIGURES

FIG. 6A is a schematic view illustrating an embodiment of a chargeback ledger prior to a chargeback being reported;

FIG. 6B is a schematic view illustrating an embodiment of a chargeback ledger including a reported chargeback;

FIG. 6C is a schematic view illustrating an embodiment of a chargeback ledger with an addressed chargeback;

FIG. 6D is a schematic view illustrating an embodiment of a chargeback ledger with an addressed chargeback;

Figure 1:
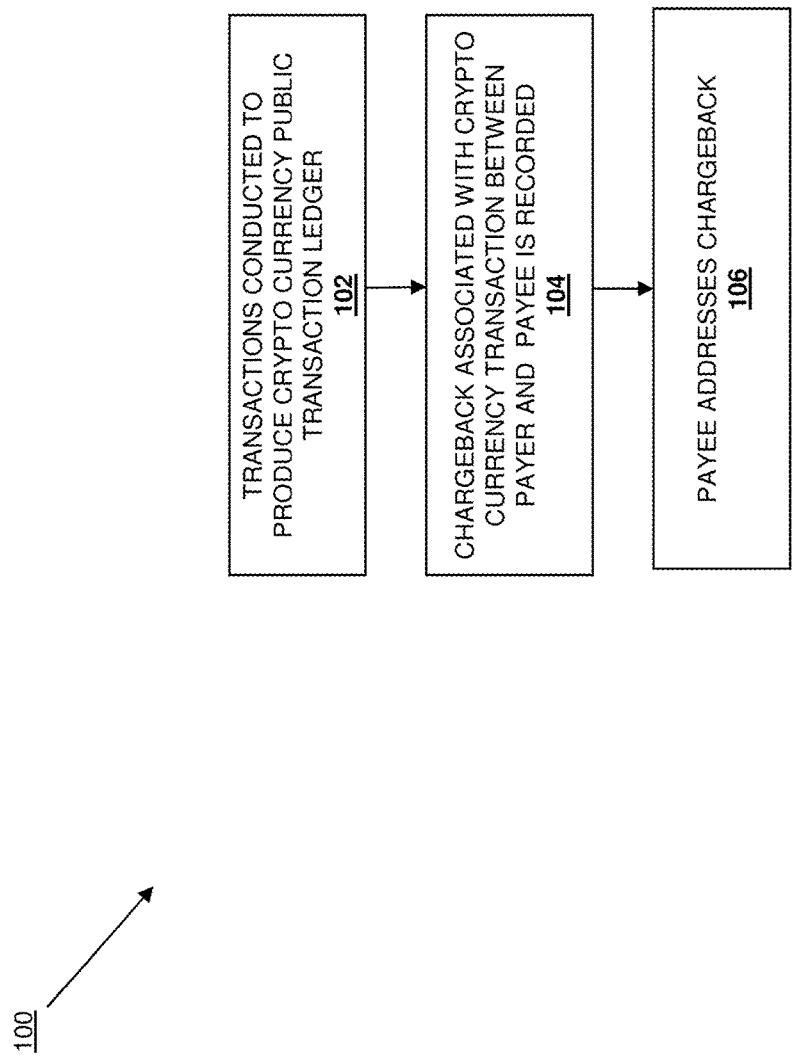
FIG. 1 is a flow chart illustrating an embodiment of a method for providing a distributed crypto currency chargeback system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Some embodiments of the present disclosure provide systems and methods for reporting, recording, and/or publishing chargeback requests in association with completed transactions performed in a distributed crypto currency system. A chargeback ledger maybe provided as part of, or along with, a crypto currency public ledger, to allow for the reporting of chargeback requests for any crypto currency transaction recorded and published in the crypto currency public ledger between a payer and payees Payees and/or third parties may then monitor the chargeback ledger to determine whether a chargeback has been recorded and published in association with a transaction in which the payee was involved and, if so, the payee or third party may perform a variety of actions to address that chargeback. For example, in response to a determining a chargeback has been reported in a transaction in which the payee has been involved, the payee may choose to refund the payer by transferring the crypto currency back to the payer (e.g., in a conventional crypto currency transaction carried out on the crypto currency public ledger), satisfy the transaction by ensuring goods or services purchased as part of the transaction have been received by the payer, dispute the chargeback, and/or perform other chargeback response actions. Furthermore, third parties may be utilized in transactions between payers and payees to "insure" transactions and possibly return crypto currency to the payer when a chargeback is recorded (e.g., as part of chargeback insurance taken out by the payee to satisfy chargebacks reported by payers, as part of chargeback insurance taken out by the payer to satisfy chargebacks disputed by the payee, etc.). Further still, benefits of the chargeback ledger may extend to users who are not part of a transaction associated with the chargeback, as when a user of the distributed crypto currency system is considering performing a transaction with a payer or payee that has previously been involved in one or more chargebacks, the chargeback ledger may be utilized to collect information about that payer and/or payee based on the chargebacks with which they've been involved, which allows the user to determine whether to proceed with a subsequent transaction (e.g., based on whether the payee satisfies chargebacks, whether the payer repeatedly reports chargebacks, etc.).

Referring now to FIGS. 1, 2, 3, and 4, a method 100 for providing distributed crypto currency chargebacks is illustrated. In some embodiments of the method 100 described below, one or more system provider devices may operate to perform the method 100. For example, a distributed group of devices may operate to create (a.k.a., "mine") the distributed crypto currency, monitor transactions performed using the crypto currency (e.g., an action that may be performed during the creation of the distributed crypto currency via a crypto currency public ledger), receive chargeback reports for any transaction performed using the crypto currency, record the chargeback requests in a chargeback ledger (either as part of the crypto currency public ledger or as part of a separate chargeback public ledger), and/or otherwise perform the method 100 as detailed below. In another embodiment, one or more system provider devices may perform the method 100 separate from the creation/monitoring of the distributed crypto currency. For example, a payment service provider such as, for example, PayPal, Inc. of San Jose, Calif., may utilize a payment service provider device to perform the method 100 discussed below, and in some embodiments may operate in cooperation with one or more other system providers (via their system provider devices), payees (via their payee devices), payers (via their payer devices), and/or users (via their user devices) to perform the method 100 discussed below. However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Figure 2:
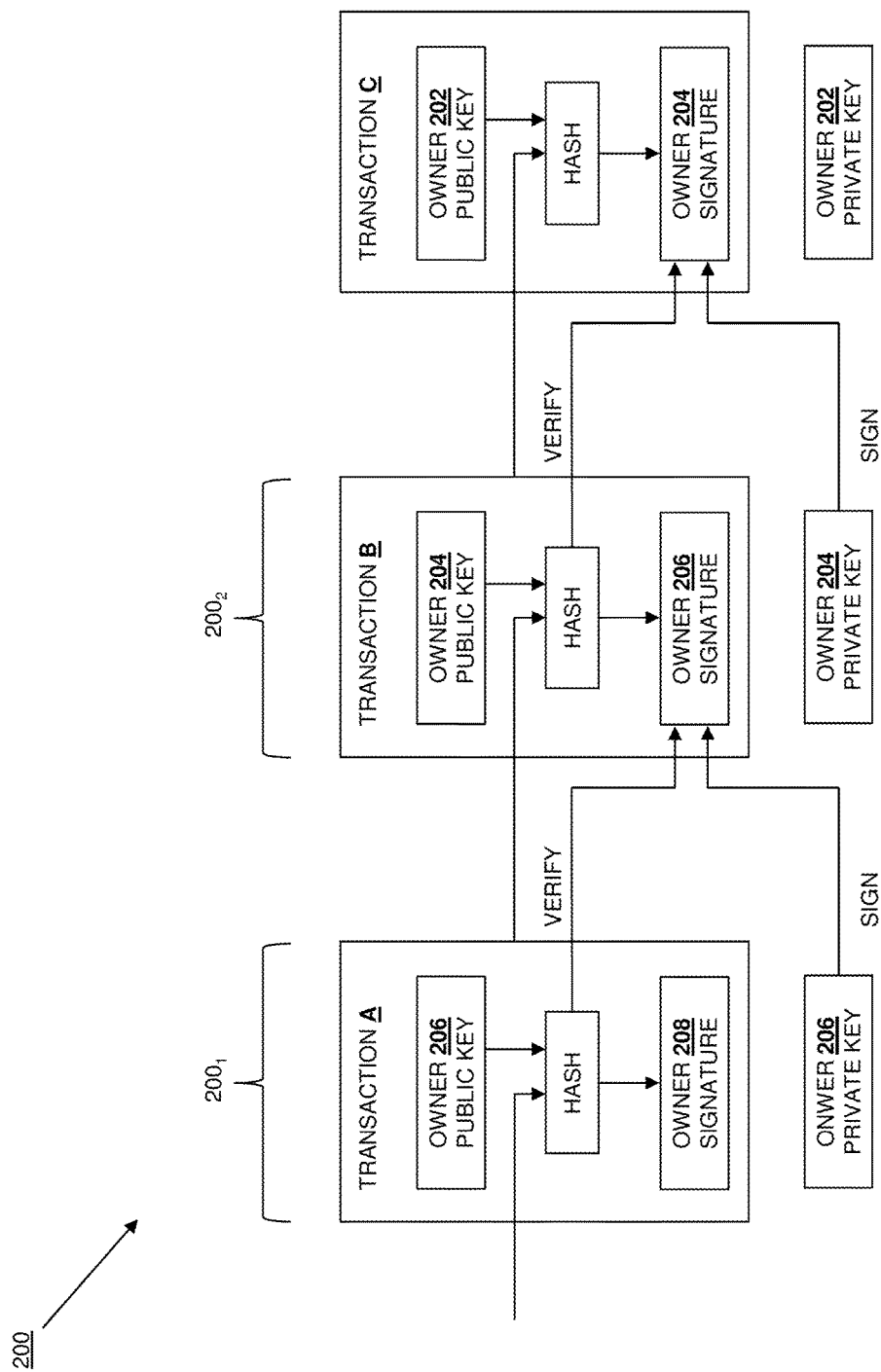
FIG. 2 is a schematic view illustrating an embodiment of an electronic coin.

Referring now to FIG. 2, an embodiment of an electronic coin 200 is illustrated and described briefly for reference to the method 100 discussed below. The crypto currency system associated with the present disclosure defines an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of the previous owners 204, 206, and 208. Specifically, in transaction A, a hash of the public key of owner 206 (i.e., the owner receiving, as a result of transaction A, an electronic coin $200_1$ defined by digital signatures provided up to transaction A) and the previous transaction (not illustrated, but occurring prior to transaction A) was signed by owner 208 (i.e., the owner providing, as a result of transaction A, the electronic coin $200_1$ defined by digital signatures provided up to transaction A) and added to an initial electronic coin (which was defined by digital signatures provided up to the transaction prior to transaction A) such that the electronic coin $200_1$ was transferred to owner 206.

Similarly, in transaction B, a hash of the public key of owner 204 (i.e., the owner receiving, as a result of transaction B, an electronic coin $200_2$ defined by digital signatures provided up to transaction B) and transaction A was signed by owner 206 and added to the electronic coin $200_1$ such that the electronic coin $200_2$ was transferred to owner 204. Similarly, in transaction C, a hash of the public key of owner 202 (i.e., the owner receiving, as a result of transaction C, the electronic coin 200 defined by digital signatures provided up to transaction C) and the transaction B was signed by owner 204 and added to the electronic coin $200_2$ such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coins" is used to encompass any amount of electronic coins, from fractions of a coin (e.g., 0.00564500 electronic coins) to many multiples of coins (e.g., 56,000.00000000 electronic coins).

Figure 3:
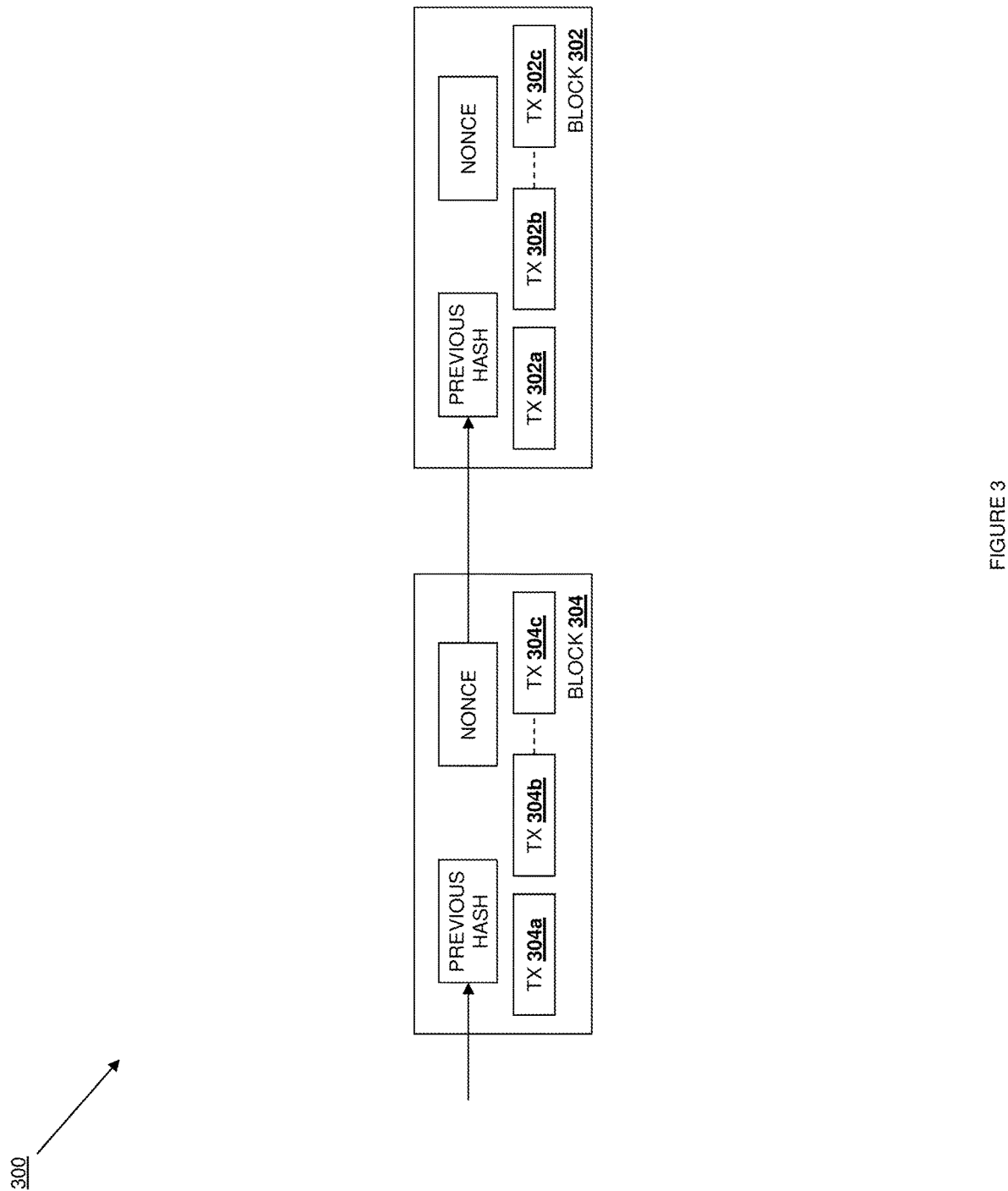
FIG. 3 is a schematic view illustrating an embodiment of a crypto currency public ledger.

Referring now to FIG. 3, an embodiment of a crypto currency public ledger 300 is illustrated and described briefly for reference to the method 100 discussed below. The crypto currency public ledger 300 operates to verify that payers transferring an electronic coin (e.g., referring back to FIG. 2, owner 206 in transaction A, owner 204 in transaction B, and owner 202 in transaction C) did not "double-spend" (e.g., sign any previous transactions involving) that electronic coin. To produce the crypto currency public ledger 300, a distributed network of devices operates to agree on a single history of transactions in the order in which they were received such that it may be determined that a transaction between a payer and a payee using an electronic coin is the first transaction associated with that electronic coin. Each device in the distributed network operates collect new transactions into a block, and then to increment a proof-of work system that includes determining a value that when hashed with the block provides a required number of zero bits.

For example, for a block 302 that includes a plurality of transactions 302a, 302b, and up to 302c, a device in the distributed network may increment a nonce in the block 302 until a value is found that gives a hash of the block 302 the required number of zero bits. The device may then "chain" the block 302 to the previous block 304 (which may have been "chained" to a previous block, not illustrated, in the same manner). When devices in the distributed network find the proof-of-work for a block, that block (e.g., block 302) is broadcast to the distributed network, and other devices in the distributed network will accept that block if all the transactions in it are valid and not already spent (which may be determined by creating the next block using the hash of the accepted block 302). The distributed network will always consider the longest chain of blocks to be the correct one, and will operate to continue to extend it. If a device receives two different versions of a block, it will work on the first block received, but save the second block received in case the branch of the chain that includes the second block becomes longer (at which point that device with switch to working on the branch of the chain that includes the second block).

In the manner described above, a distributed crypto currency system is provided in which payers and payees may participate in transactions with each other using the electronic coins discussed above and without the need for a centralized authority such as a bank. Each of those transactions is recorded in the crypto currency public ledger to ensure that the electronic coins may only be spent by a payer once. However, as described above, the transactions in such distributed crypto currency systems are not reversible without cooperation of a payee and, as such, put a significant portion of the risk associated with the transaction on the payer. The method 100 contemplates improvements on such distributed crypto currency systems that provides for the reporting, recording, and publishing of chargeback requests or reports (also referred to as simply "chargebacks" herein) associated with transactions recorded in the crypto currency public ledger, which allows payers to express dissatisfaction with transactions, payees to attempt to address the chargeback request, and provides for a record of payer and payee behavior in crypto currency transactions that may be utilized by any user in the distributed crypto currency system.

Figure 4:
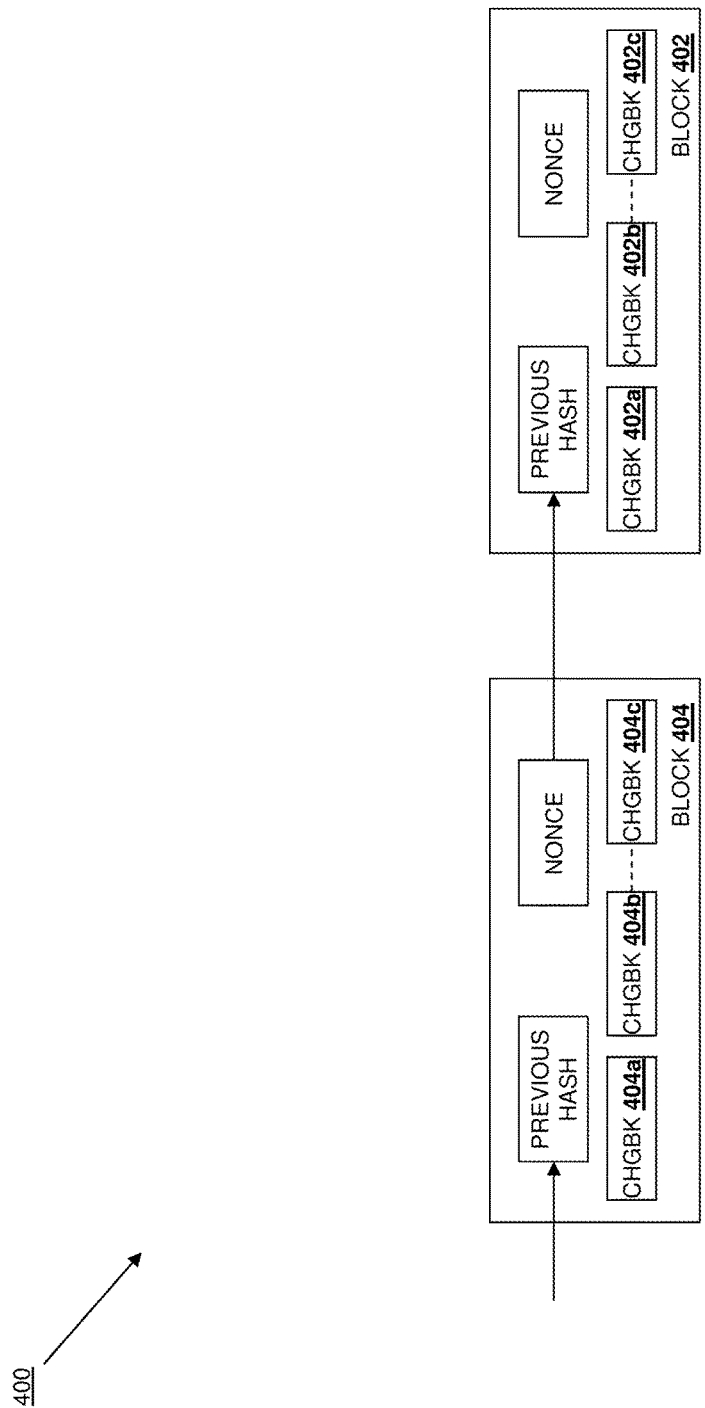
FIG. 4 is a schematic view illustrating an embodiment of a chargeback ledger.

Referring now to FIG. 4, an embodiment of a chargeback ledger 400 is illustrated and described briefly for reference to the method 100 discussed below. The crypto currency system associated with the present disclosure may either provide the chargeback ledger 400 as part of the crypto currency public ledger 300 discussed above (e.g., by adding the ability to collect the chargeback information discussed below as part of that crypto currency public ledger 300), or provide the chargeback ledger 400 as a separate chargeback public ledger that exists alongside the crypto currency ledger 300 discussed above with reference to FIG. 3. As such, to produce the chargeback ledger 400, one or more system provider devices and/or a distributed network of devices may operate to agree on a single history of chargebacks associated with transactions between payers and payees, including the reporting and addressing of those chargebacks, to allow the recording and publishing of chargeback information either as part of the crypto currency public ledger 300 discussed above with reference to FIG. 3, or as part of a separate chargeback public ledger that exists alongside the crypto currency public ledger 300. For example, in the event the chargeback ledger 400 is provided as a separate chargeback public ledger, each device may operate to associate the chargeback information discussed below with transactions provided in a block, and then to increment a proof-of work system that includes determining a value that when hashed with the block provides a required number of zero bits, similarly as discussed below.

For example, for a block 402 that includes a plurality of chargebacks 402a, 402b, and up to 402c, a device may increment a nonce in the block 402 until a value is found that gives a hash of the block 402 the required number of zero bits. The device may then "chain" the block 402 to the previous block 404 (which may have been "chained" to a previous block, not illustrated, in the same manner). When the device or devices find the proof-of-work for a block, that block (e.g., block 402) may be broadcast to the distributed network or other system provider devices, and other devices will accept that block if all the transfers in it are valid (which may be determined by creating the next block using the hash of the accepted block 402). The distributed network will always consider the longest chain of blocks to be the correct one, and will operate to continue to extend it. If a device receives two different versions of a block, it will work on the first block received, but save the second block received in case the branch of the chain that includes the second block becomes longer (at which point that device with switch to working on the branch of the chain that includes the second block).

As such, in some embodiments, the chargeback or chargeback requests provided in the distributed crypto currency chargeback system discussed herein may be recorded and published in a substantially similar manner to the transactions performed with the distributed crypto currencies. In some examples of those embodiments, the creation and monitoring of the chargebacks may be performed by a distributed network of computing systems, similar to crypto currencies. In fact, in some embodiments, the creations and monitoring of the chargebacks may be performed by the same distributed network of computing systems that provides the crypto currency with which they are used. In other embodiments, the creation and monitoring of the chargebacks may be performed by a central authority such as the system provider(s) discussed below. As such, the chargebacks recorded in the distributed crypto currency chargeback system may not be created and monitored like a distributed crypto currency, but rather may be recorded and tracked by the system provider device(s) without the public keys, signatures, and/or private keys utilized in tracking the transactions in the distributed crypto currency system. As such, a wide variety of variation in the manner in which chargebacks are reported, recorded, and published in the distributed crypto currency chargeback system are envisioned as falling within the scope of the present disclosure.

Figure 5:
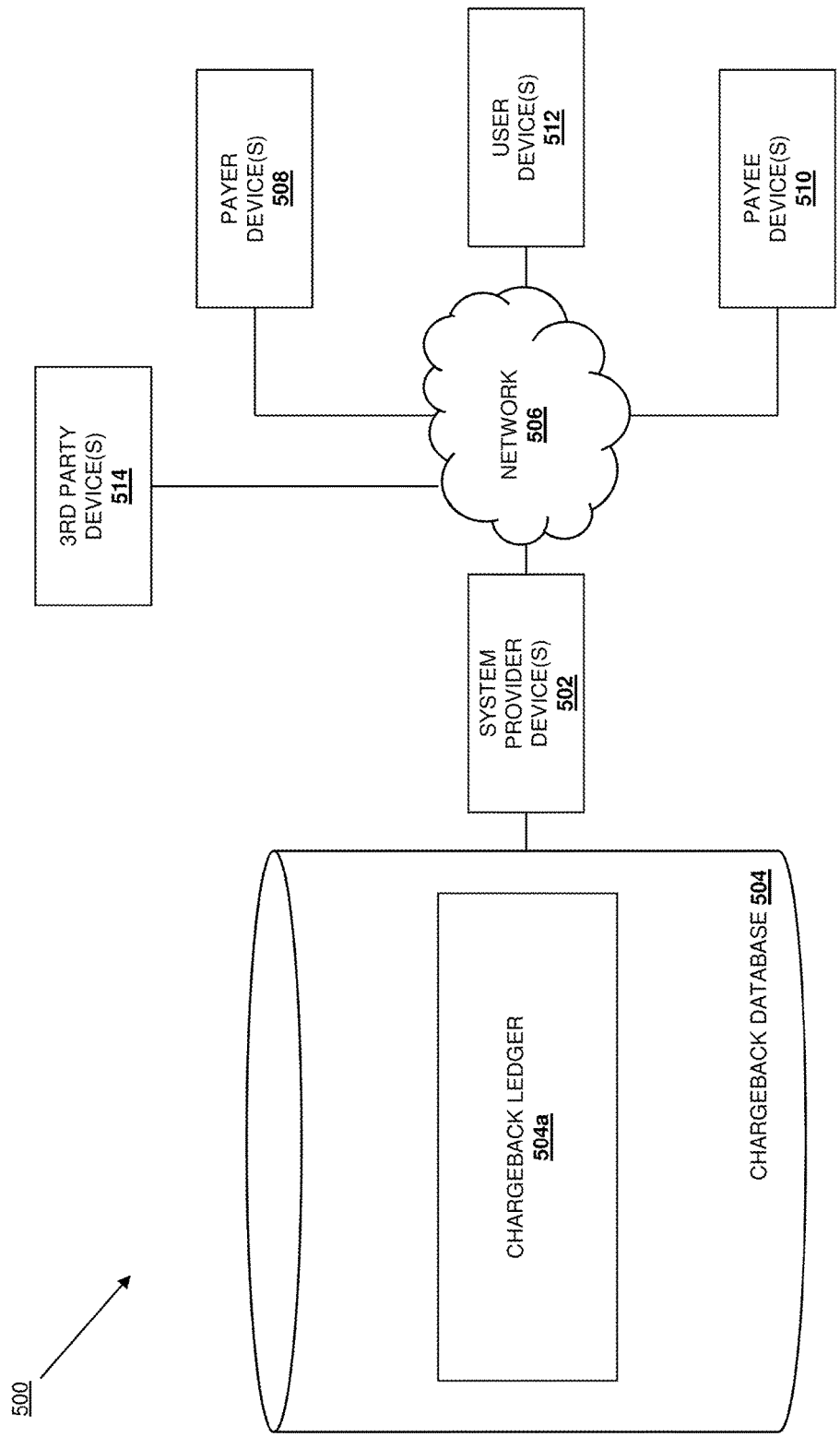
FIG. 5 is a schematic view illustrating an embodiment of a distributed crypto currency chargeback system.

Referring now to FIGS. 1 and 5, the method 100 begins at block 102 where transactions are conducted to produce a crypto currency public ledger. FIG. 5 illustrates an embodiment of a distributed crypto currency chargeback system 500 that includes one or more system provider device(s) 502 that are coupled to one or more chargeback database(s) 504. In some embodiments, the system provider device(s) 502 may include one or more system provider devices that are connected to or otherwise have access to a chargeback database(s). In other embodiments, the system provider device(s) 502 may be a plurality of system provider devices that each includes an identical chargeback database (e.g., that includes the ledgers discussed above) that is shared with each of the system provider devices in the distributed crypto currency chargeback system 500 (discussed in further detail below). The system provider device(s) 502 are couple through a network 504 (e.g., the Internet) to one or more payer devices 508, one or more payee devices 510, one or more user devices 512, and/or one or more third party devices 514.

As discussed in further detail below, the distributed crypto currency chargeback system 500 may operate as part of, or alongside, a distributed crypto currency system that is not explicitly illustrated in FIG. 5. However, as described above, the user devices 512 may be operated by users of the distributed crypto currency system and may be used to create and monitor the distributed crypto currency as discussed above with reference to the electronic coin 200 of FIG. 2 and the crypto currency public ledger 300 of FIG. 3.

While the user device(s) 512 and the system provider device(s) 502 are illustrated as separate in FIG. 5, it should be understood that in some embodiments, the user devices 512 that provide the distributed crypto currency system may also be the system provider device(s) 502 that provide distributed crypto currency chargeback system 500 and thus have access to the chargeback database 504. However, as also discussed above, the system provider device(s) 502 may be separate from the user device(s) 512 that provide the distributed crypto currency system such that only those system provider device(s) 502 may control the recording and publishing of chargebacks and, in some cases, chargeback resolution. Furthermore, while the chargeback database 504 in the illustrated embodiment includes a chargeback ledger 504a (for recording and publishing chargebacks) that is described as a public ledger, other embodiments of the distributed crypto currency chargeback system 500 may record and publish chargebacks that are not associated with public ledgers.

In an embodiment of block 102, transactions are performed such that the crypto currency public ledger 300 is produced. As discussed above with reference to FIG. 3, a crypto currency public ledger is generated through a use of a crypto currency in a distributed crypto currency system. In one example of block 102, the system provider device(s) 502 may be involved in the creation of the crypto currency public ledger and may monitor that crypto currency public ledger as it is created by themselves and/or other user device(s) 512. In another example of block 102, the system provider device(s) 502 may not be involved in the creation of the crypto currency public ledger and that crypto currency public ledger may be created by the other user device(s) 512. As is described above, a crypto currency public ledger may be created by devices incrementing a proof-of-work system on blocks of transactions to create of a chain of blocks that include valid transactions as agreed upon by the majority of those devices. In some embodiments of block 102, the system provider device(s) 502, third party device(s) 514, payee device(s) 508, and/or payer device(s) 510 may monitor that crypto currency public ledger and, specifically, the confirmed transactions in the valid blocks that are added to the crypto currency public ledger and agreed with by a majority of the distributed network of devices.

The method 100 then proceeds to block 104 where a chargeback associated with a crypto currency transaction between a payer and a payee is reported. Referring now to FIG. 6A, an embodiment of a chargeback ledger 600 is illustrated that includes a transaction identifier column 602, a "from" column 604, a "to" column 606, an amount column 608, a chargeback status column 610, and a refund transaction identifier column 612. One of skill in the art in possession of the present disclosure will recognize that the chargeback ledger 600 includes entries (e.g., in the transaction identifier column 602, the "from" column 604, the "to" column 606, and the amount column 608) that may include information that is generated during an associated crypto currency transaction (and included in the crypto currency public ledger 300 discussed above). For example, in the embodiment illustrated in FIG. 6A, the row 614 in the chargeback ledger 600 is provided for a crypto currency transaction between a payer and a payee that was performed at block 102, and includes a transaction identifier in the transaction identifier column 602, a payer identifier in the "from" column 604, a payee identifier in the "to" column 606, and a crypto currency amount in the amount column 608. The row 614 in the chargeback ledger 600 in FIG. 6A provides an example of a crypto currency transaction in the chargeback ledger 600 for which no chargeback has been reported by the payer and thus no information is provided in the status column 610 or the refund transaction identifier column 612. One of skill in the art in possession of the present disclosure will recognize that a crypto currency transaction may generate information other than that illustrated in the chargeback ledger 600, and thus the inclusion of that information into the chargeback ledger as well is envisioned as falling within the scope of the present disclosure In some embodiments, the identification of payers and payees in the "from" column 604 and "to" column 606 of the chargeback ledger 600 may be performed using systems that link public keys utilized in crypto currency transactions (as discussed above) with users. For example, data mining techniques may be utilized with the crypto currency public ledger 300 to identify public keys used in crypto currency transactions and associated those public key(s) with a common (and in many cases anonymous) user, and that user may then be identified in the chargeback ledger 600 using the payer identification information and payee identification information as illustrated. One of skill in the art in possession of the present disclosure will recognize that such payer and payee identification information, even when anonymous, may still allow a user to identify a payer or payee in the chargeback ledger 600 prior to getting involved in a crypto currency transaction with that payer or payee. In addition, future regulatory requirements for crypto currency systems may (and are likely to) involve the identification of actual users associated with the public keys they utilize in crypto currency transactions, and those identifications will provide enhancements to the system by enabling actual payer and payee identification information to be included in the chargeback ledger 600. However, even in the event such actual payer and/or payee identifications are made, the identification of payers and/or payees in the chargeback ledger 600 may remain anonymous or pseudo anonymous to protect the identities of the users of the system.

In an embodiment of block 104 of the method 100, the payer involved in the transaction included in row 614 of the chargeback ledger 600 may record a chargeback by launching their crypto currency wallet application on their payer device (e.g., to access a crypto currency wallet that was used in the transaction identified in row 614 to transfer the crypto currency to the payee), selecting the transaction identified in row 614 of the chargeback ledger 600, and providing an instruction to report the chargeback. In a specific example, the crypto currency wallet may be configured to render a graphical user interface that allows the payer to select a "chargeback request" button on the crypto currency wallet that is associated with the crypto currency transaction identifier in row 614 in order to report the chargeback. However, in another embodiment, the reporting of a chargeback may involve "spending" a chargeback reporting element in the same manner in which crypto currency is spent to perform a crypto currency transaction. For example, the performance of the crypt currency transaction may cause the allocation of a chargeback request element (similar to the electronic coin 200 discussed above with reference to FIG. 2) to the payer that is linked to the associated crypto currency transaction, and at block 104 the payer may then transfer that chargeback reporting element to the payee (e.g., in a similar manner in which the electronic coin was transferred to the payee) in order to report the chargeback. As such, the system provider device(s) 502 and/or user device(s) 512 may detect that chargeback reporting element and incorporate it into the chargeback ledger 600 as discussed above. FIG. 6B illustrates the chargeback ledger 600 following the reporting of the chargeback by the payer, and including a chargeback identifier in the status column 610 of row 614. While a simple report of the chargeback (e.g., "REPORTED") is illustrated in FIG. 6B, at block 104 the payer may report any of a variety of information about the crypto currency transaction that is resulting in the chargeback, including a chargeback reason (e.g., that the product purchased in the crypto currency transaction was not received), a requested chargeback amount (e.g., the entire amount, less than the entire amount, etc.), and/or any other chargeback information known in the art while remaining within the scope of the present disclosure.

In some embodiments, a chargeback may only be reported for a crypto currency transaction between a payer and a payee if a minimum number of confirmations of the crypto currency transaction (i.e., the block that includes that crypto currency transaction) have been received by the devices (e.g., the user device(s) 612, the system provider device(s) 602, etc.) that provide the distributed crypto currency system. For example, it is currently generally considered that six confirmation of a crypto currency transaction are sufficient to rely on that crypto currency transaction (i.e., to assume that that crypto currency transaction will be part of a block in the longest chain of blocks being incremented by the devices that provide the distributed crypt currency system), but more or fewer confirmations to allow the reporting of a chargeback will fall within the scope of the present disclosure. While an example of a single crypto currency transaction between a particular payer (e.g., via their payer device 608) and a particular payee (e.g., via their payee device 610) is provided herein as being involved in the chargeback of the method 100, one of skill in the art in possession of the present disclosure will recognize that chargebacks according to the method 100 may be performed with any crypto currency transaction occurring in the distributed crypto currency system, and thus the chargeback ledger 600 may include many more chargeback reports, and in many cases will include a history of all of the chargeback reports that have occurred in the crypto currency chargeback system.

At block 104, any of the users in the crypto currency chargeback system may monitor the chargeback ledger 600 to detect reported chargebacks. As discussed above, the chargeback ledger 600 may be published and reviewable by any user in the system (e.g., via an electronic wallet, other ledger monitoring software, via a website accessed through the Internet, etc.). For example, the payee involved in the transaction identified in row 614 of the chargeback ledger 600 may periodically monitor the chargeback ledger 600 via their payee device and detect when the chargeback is reported as illustrated in FIG. 6B. Furthermore, crypto currency wallet software on the payee devices may be configured to identify when a chargeback has been reported in a transaction that crypto currency wallet software was involved in and, in response, identify that chargeback report (e.g., in a graphical user interface). In another example, a third party (e.g., at the request of the payee or other user in the system) may monitor the chargeback ledger 600 via their third party device and detect when the chargeback is reported as illustrated in FIG. 6B. As such, third parties (i.e., to the payer and payee, and which may include the devices that provide the system) may perform chargeback detection functionality as an extension of the crypto currency system, and may make that chargeback detection easily accessible by the users of the system (e.g., via a searchable database, identification subsequent to any crypto currency transaction etc.).

The method 100 then proceeds to block 106 where the chargeback is addressed. In different embodiments, a payee that detects (or is informed of) a chargeback in the chargeback ledger 600 may respond to that chargeback report in a variety of manners. For example, with reference to FIG. 6C, the payee may decide to refund some amount of the transaction identified in row 614 of the chargeback ledger 600 by transferring that amount of crypto currency back to the payer, and may subsequently provide a transaction identifier for that "refund transaction" (e.g., "987654321" in this example) in the refund transaction identifier column 612 along with a new status identifier ("REFUNDED") in the status column 610. In a specific example, the crypto currency wallet may be configured to render a graphical user interface that allows the payee to select a "chargeback response" button on the crypto currency wallet that is associated with the crypto currency transaction identifier in row 614 in order to address the chargeback by providing the information as discussed above. However, in another embodiment, the reporting of a chargeback may involve "spending" a chargeback reporting element in the same manner in which crypto currency is spent to perform a crypto currency transaction. For example, the payee may have received a chargeback request element from the payer that is linked to the associated crypto currency transaction as discussed above, and at block 106 the payee may then transfer that chargeback reporting element back to the payer (e.g., in a similar manner in which the electronic coin was transferred to the payee) along with the information discussed above. As such, the system provider device(s) 502 and/or user device(s) 512 may detect that chargeback reporting element and incorporate it into the chargeback ledger 600 as detailed in FIG. 6C. One of skill in the art in possession of the present disclosure will recognize that row 614 in the chargeback ledger 600 illustrated in FIG. 6C indicates to a user of the crypto currency chargeback system reviewing the chargeback ledger 600 that a chargeback was instituted against the payee involved in that transaction, and that the payee refunded the amount of the transaction to the payer in response.

In another example, with reference to FIG. 6D, in some embodiments the payee may decide to attempt to satisfy the payer by providing a product or service associated with the transaction identified in row 614 of the chargeback ledger 600 to the payer (or ensuring such a product or service was properly provided to the payer), and may subsequently provide a new status identifier ("SHIPPED") in the status column 610. Similarly as discussed above, the crypto currency wallet may be configured to render a graphical user interface that allows the payee to select a "chargeback response" button on the crypto currency wallet that is associated with the crypto currency transaction identifier in row 614 in order to address the chargeback by providing the information as discussed above. However, the reporting of a chargeback may involve "spending" a chargeback reporting element in the same manner in which crypto currency is spent to perform a crypto currency transaction. For example, the payee may have received a chargeback request element from the payer that is linked to the associated crypto currency transaction as discussed above, and at block 106 the payee may then transfer that chargeback reporting element back to the payer (e.g., in a similar manner in which the electronic coin was transferred to the payee) along with the information discussed above. As such, the system provider device(s) 502 and/or user device(s) 512 may detect that chargeback reporting element and incorporate it into the chargeback ledger 600 as detailed in FIG. 6C. One of skill in the art in possession of the present disclosure will recognize that row 614 in the chargeback ledger 600 illustrated in FIG. 6B indicates to a user reviewing the chargeback ledger 600 that a chargeback was instituted against the payee involved in that transaction, and that the payee provided the product or service to the payer. In such an embodiment, the payer may decide to again report the chargeback if they are not satisfied with the payees attempt to satisfy their chargeback report, and such chargeback reporting may proceed in substantially the same manner as discussed above.

While the provisioning of status identifiers by the payee (e.g., "REFUNDED", "SHIPPED", etc.) has been described above, any other types of status identifiers that identify the status of a chargeback report are envisioned as falling within the scope of the present disclosure. Furthermore, such status identifiers may be identified and/or verified by accounting or mining subsystems that may utilize payee databases, shipping company tracking identifiers (which may be anonymized prior to inclusion into the chargeback ledger), and/or other information to enable more detailed chargeback status updates in the chargeback ledger 600 and/or to, for example, entities provided the chargeback insurance discussed below.

The performance of the method 100 allows for the tracking of chargebacks between payers and payees that have been involved in crypto currency transactions with each other using the distributed crypto currency system. The reporting of and, in some cases satisfaction of, chargebacks between payers and payees that have been involved in a crypto currency transaction allows other users to determine levels of satisfaction with crypto currency transactions that particular payees are involved in. For example, a payer may transfer electronic coins to a payee and receive products or services in response. If the payer is unsatisfied with the products or services received, the payer may then report a chargeback and wait for the payee to respond. In many cases, the payee may address the chargeback in order to maintain their reputation in the system and ensure that the payer is satisfied. However, the system also allows the payee to ignore that chargeback, which in some cases may be justified if the payee provided the requested product and/or service to the payer, the payer frequently requests such chargebacks (which may be indicated in the chargeback ledger), and/or in response to other payer issues known in the art. However, payees that repeatedly ignore such chargeback requests may be identified through the chargeback ledger, and other users of the system may avoid that payee (as the reporting of repeated chargebacks and refusal to satisfy those chargebacks are an indication that they payee may not be trustworthy to make purchases from).

Thus, the systems and methods of the present disclosure allows users of the system (e.g., through their user devices) to retrieve, view, and analyze the chargeback information provided in the chargeback ledger 600 to determine how transactions in the distributed crypto currency reputation system have gone (and particularly the level of satisfaction with the payees in those crypto currency transactions. This provides any user of the distributed crypto currency chargeback system the ability to determine whether to participate in a crypto currency transaction with other users, and allows payers of the distributed crypto currency chargeback system to express dissatisfaction with any crypto currency transaction they participate in by requesting a chargeback. As such, the risk borne by payers in a distributed crypto currency system may be reduced by allowing those users some degree of knowledge about how payees in the distributed crypto currency system have dealt with past transactions, and that degree of knowledge may be used to determine whether or not to participate in a crypto currency transaction with that payee.

In some embodiments, parties other than the payer and the payee may participate in the crypto currency chargeback system in order to provide several benefits beyond those explicitly described above with regard to the chargeback ledger 600. As discussed above, the third party associated with the third party device(s) 514 in FIG. 5 may include "chargeback insurance entities" that can operate to determine risk associated with transactions involving payers and/or payees, and insure any of those transactions to enable chargebacks in the event a payer requests one. For example, either or both of the payer and payee may insure a transaction via such a third party entity and have chargebacks satisfied by that third party entity. In a specific example, the payee may pay a portion of each transaction it conducts with payers so that the third party entity will cover any chargebacks reported against them. The third party entity may analyze transactions conducted across the system, chargebacks reported in the chargeback ledger, and/or any other information available to assess the risk of insuring transactions involving any payer/payee combination, and determine whether to insure such transactions (or the cost of doing so). In some embodiments, the third party entity may determine that the risk associated with a transaction is too high, and refuse to insure any particular transaction if the payer or payee proceeds with it. Chargeback data may be collected by the third party entity and utilized to detect payers that are abusive of the chargeback system (e.g., repeatedly requesting chargebacks), and in some cases result in warnings to payees who attempt to participate in transactions with such payers.

Furthermore, crypto currency wallets may be configured to retrieve data from the chargeback ledger 600 and utilize that data to provide "payer ratings" and "payee ratings", prior to a transaction between any payer and payee, that indicate to a user how likely the payer is to report a chargeback or the payee is to satisfy a chargeback if one is reported (e.g., based on the payer's history of reporting chargebacks, the payee's history of dealing with chargebacks, etc.). Similarly, such "payee ratings" could report to a payer, prior to conducting a transaction with those payees, whether the payees have the chargeback insurance discussed above that may be used in the event a chargeback is reported. As such, payees with a history of not satisfying legitimate chargeback requests may have trouble conducting transactions in the system, which will incentivize payees to be better actors in the system and makes payers whole when situations arise. Similarly, payers may be incentivized to only request chargeback requests when necessary, as repeated chargeback requests may make it difficult to finds payees who will participate in transactions with them. The public record of payer and payee behavior will then be easily referenced by other entities outside the system (e.g., banks and/or other companies) to determine whether to interact with that payee as well (e.g., to provide a loan, purchase the company associated with the payee, etc.).

Further still, the crypto currency chargeback system creates an open market for crypto currency transaction insurance and/or other protection that allows different entities to provide a wide range of transaction protections for both payers and payees in the system. As such, payers and payees are no longer bound to a single issuer (e.g., credit card company), and protection issuers may tailor protection packages at various levels depending on risk associated with the payers and payees, which allows the system to reward good behavior and punish (or make more expensive) bad behavior in a more efficient manner than is possible with conventional systems.

Thus, a crypto currency chargeback system has been described that introduces a level of trust among users performing commercial crypto currency transactions by providing a "public arbitration" of crypto currency transaction disputes that operates to extend more widespread commercial adoption of crypto currency systems while bringing about efficiencies and cost reductions in many aspects of digital commerce. In addition to allowing payers and payees to gain assurances with regard to transactions they are about to perform, additional crypto currency ecosystems may be developed around transaction insurance and/or other transaction protection to back those assurances while considering the risk of doing so.

Figure 7:
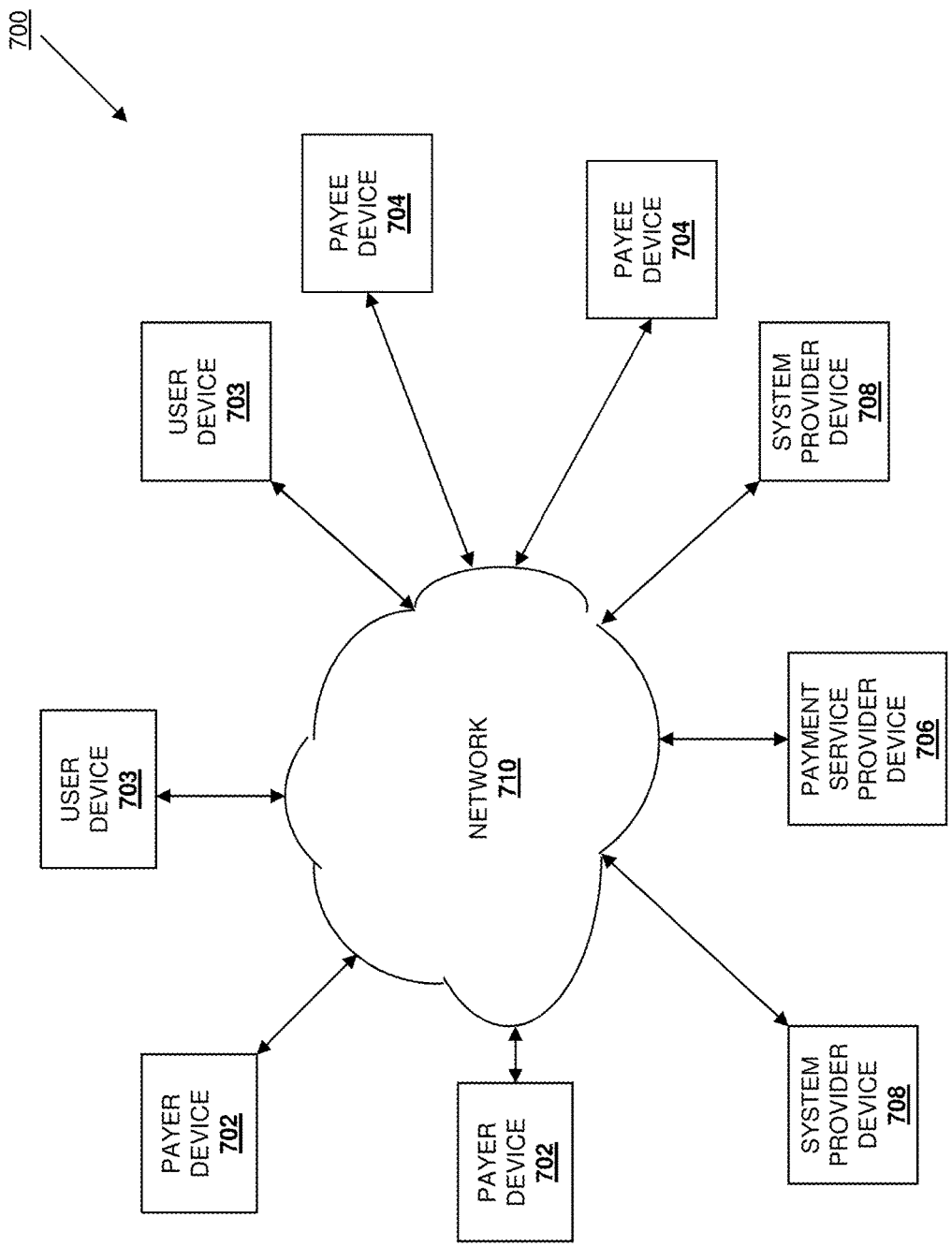
FIG. 7 is a schematic view illustrating an embodiment of a networked system.

Referring now to FIG. 7, an embodiment of a networked system 700 used in the distributed crypto currency chargeback system described above is illustrated. The networked system 700 includes a plurality of payer devices 702, a plurality of user devices 703, a plurality of payee devices 704, a payment service provider device 706, and/or a plurality of system provider devices 708 in communication over a network 710. Any of the payer devices 702 may be the payer devices operated by the payers, discussed above. Any of the user devices 703 may be the user devices operated by the users, discussed above. Any of the payee devices 704 may be the payee devices operated by the payees, discussed above. The payment service provider device 806 may be the payment service provider devices discussed above and may be operated by a payment service provider such as, for example, PayPal Inc. of San Jose, Calif. Any of the system provider devices 808 may be the system provider devices operated by the system providers, discussed above.

The payer devices 702, user devices 703, payee devices 704, payment service provider device 706, and/or system provider devices 708 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 710.

The network 710 may be implemented as a single network or a combination of multiple networks. For example, in various embodiments, the network 710 may include the Internet and/or one or more intranets, landline networks, wireless networks, and/or other appropriate types of networks.

The payer devices 702 may be implemented using any appropriate combination of hardware and/or software configured for wired and/or wireless communication over network 710. For example, in one embodiment, the payer devices 702 may be implemented as a personal computer of a user in communication with the Internet. In other embodiments, the payer devices 702 may be a smart phone, wearable computing device, laptop computer, and/or other types of computing devices.

The payer devices 702 may include one or more browser applications which may be used, for example, to provide a convenient interface to permit the payer to browse information available over the network 710. For example, in one embodiment, the browser application may be implemented as a web browser configured to view information available over the Internet.

The payer devices 702 may also include one or more toolbar applications which may be used, for example, to provide user-side processing for performing desired tasks in response to operations selected by the payer. In one embodiment, the toolbar application may display a user interface in connection with the browser application.

The payer devices 702 may further include other applications as may be desired in particular embodiments to provide desired features to the payer devices 702. In particular, the other applications may include a payment application for payments assisted by a payment service provider through the payment service provider device 706. The other applications may also include security applications for implementing user-side security features, programmatic user applications for interfacing with appropriate application programming interfaces (APIs) over the network 710, or other types of applications. Email and/or text applications may also be included, which allow the payer to send and receive emails and/or text messages through the network 710. The payer devices 702 include one or more user and/or device identifiers which may be implemented, for example, as operating system registry entries, cookies associated with the browser application, identifiers associated with hardware of the payer devices 702, or other appropriate identifiers, such as a phone number. In one embodiment, the user identifier may be used by the payee devices 704, the payment service provider device 706, and/or the system provider devices 708 to associate the payer with a particular account as further described herein.

The payee devices 704 may be maintained, for example, by a conventional or on-line merchant, conventional or digital goods seller, individual seller, and/or application developer offering various products and/or services in exchange for payment to be received conventionally or over the network 710. In this regard, the payee devices 704 may include a database identifying available products and/or services (e.g., collectively referred to as items) which may be made available for viewing and purchase by the payee.

The payee devices 704 also include a checkout application which may be configured to facilitate the purchase by the payer of items. The checkout application may be configured to accept payment information from the payers through the payer devices 702 and/or from the payment service provider through the payment service provider device 706 over the network 710.

Figure 8:
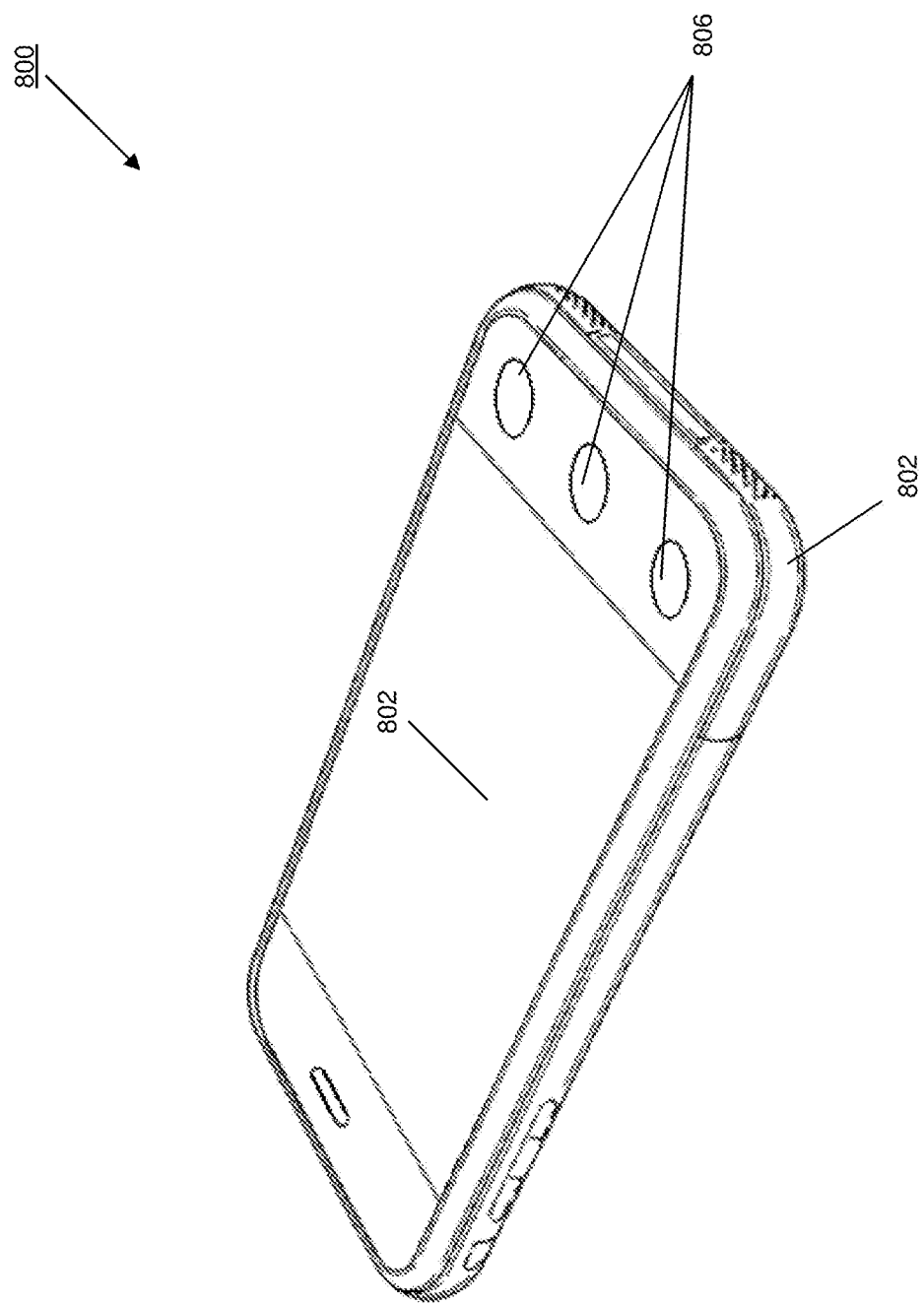
FIG. 8 is a perspective view illustrating an embodiment of a payer/payee/user device.

Referring now to FIG. 8, an embodiment of a payer/payee/user device 800 is illustrated. The device 800 may be any of the payer devices, payee devices, and/or user devices discussed above. The device 800 includes a chassis 802 having a display 804 and an input device including the display 804 and a plurality of input buttons 806. One of skill in the art will recognize that the device 800 is a portable or mobile phone including a touch screen input device and a plurality of input buttons that allow the functionality discussed above with reference to the method 100. However, a variety of other portable/mobile devices and/or desktop devices may be used in the method 100 without departing from the scope of the present disclosure.

Figure 9:
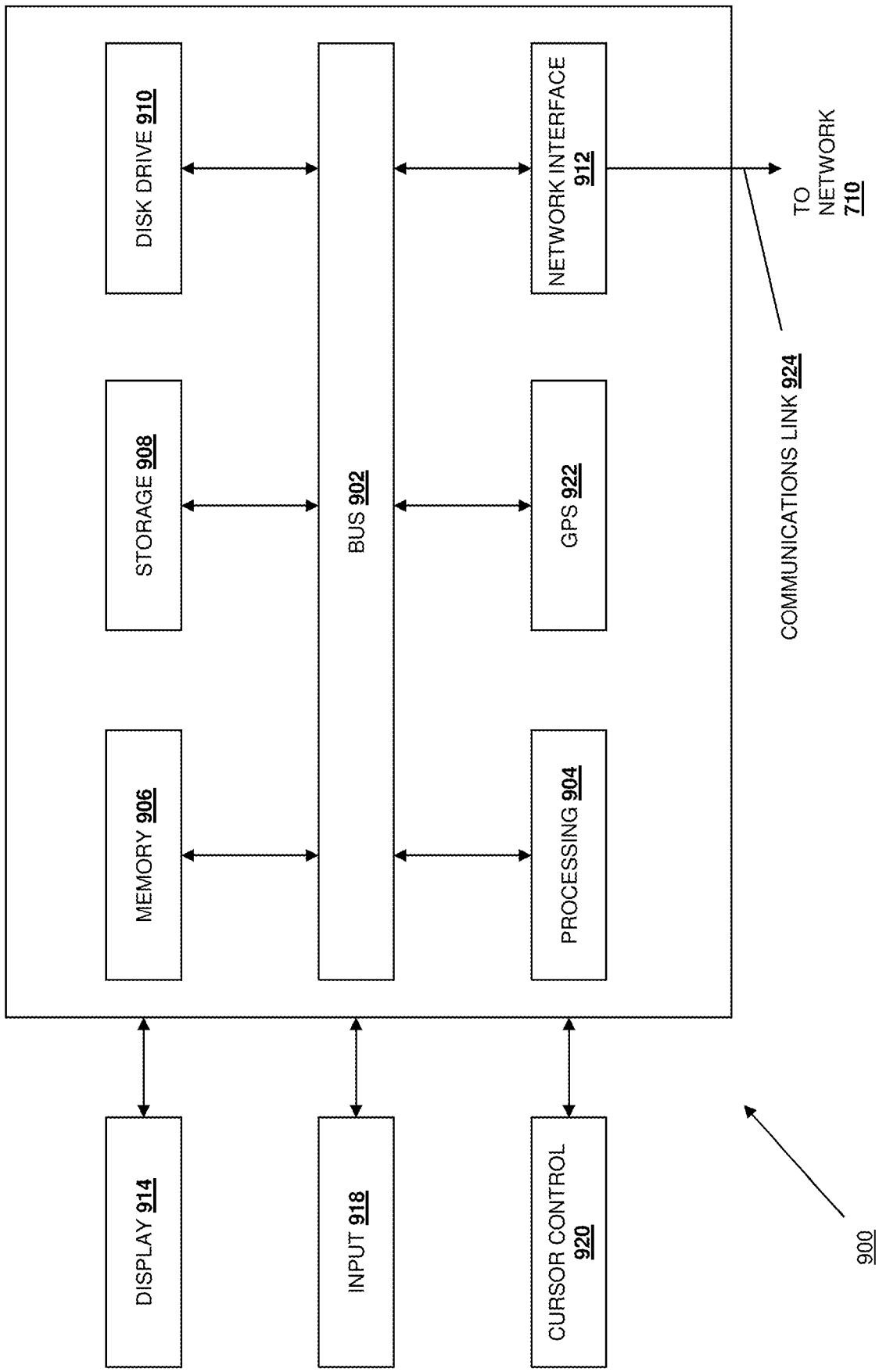
FIG. 9 is a schematic view illustrating an embodiment of a computer system.

Referring now to FIG. 9, an embodiment of a computer system 900 suitable for implementing, for example, the payer devices, user devices, payee devices, payment service provider device, and/or system provider devices, is illustrated. It should be appreciated that other devices utilized by payers, payees, users, payment service providers, and/or system providers in the distributed crypto currency reputation system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 922 (e.g., a Global Positioning System (GPS) device as illustrated, a cell tower triangulation device, and/or a variety of other location determination devices known in the art). In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the payer devices, payee devices, user devices, payment service provider devices, and/or system provider devices. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 710 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Figure 10:
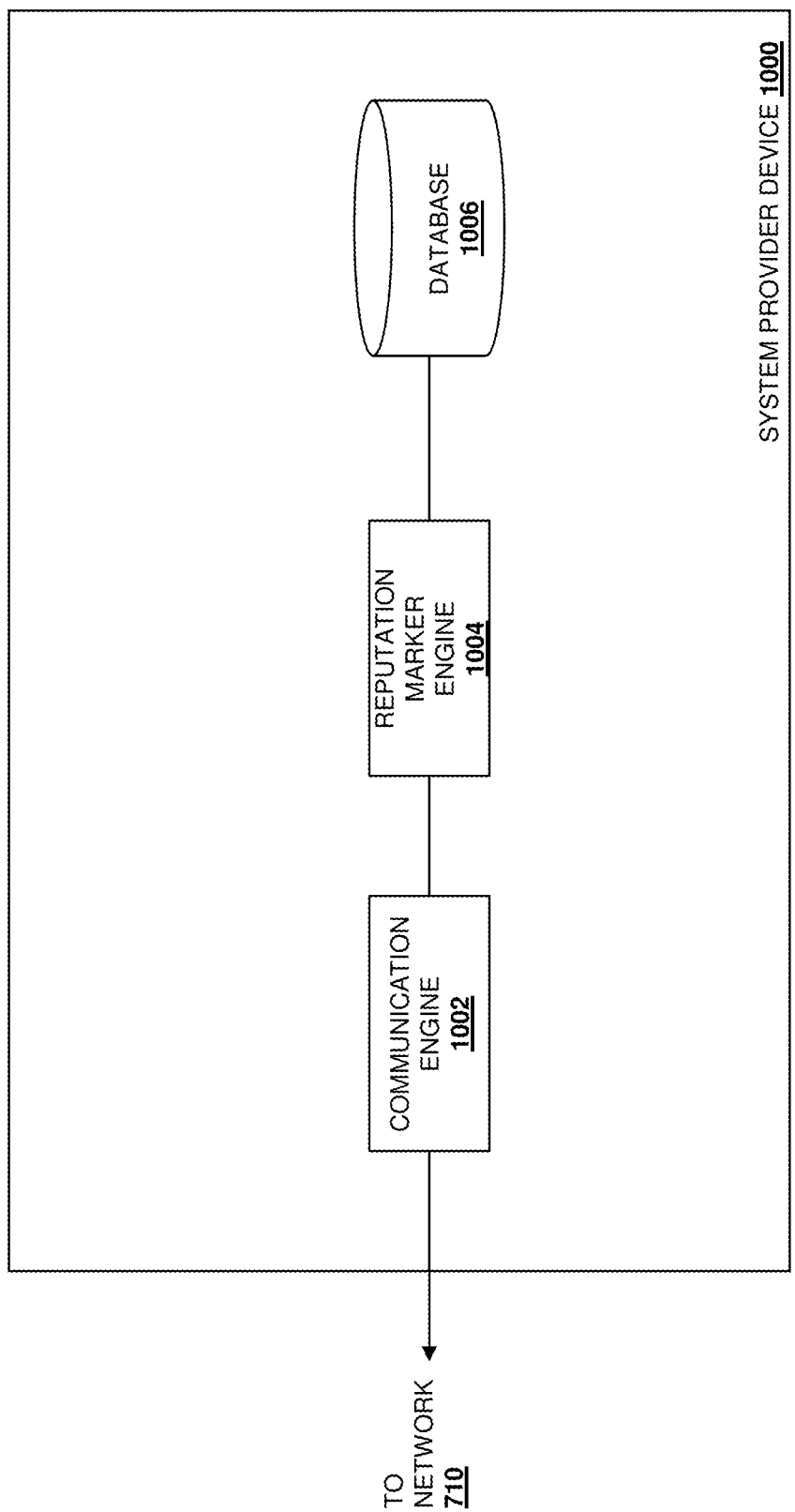
FIG. 10 is a schematic view illustrating an embodiment of a system provider device.

Referring now to FIGS. 10, an embodiment of a system provider device 1000 is illustrated. In an embodiment, the device 1000 may be any of the system provider devices discussed above. The device 1000 includes a communication engine 1002 that is coupled to the network 710 and to a chargeback engine 1004 that is coupled to a database 1006. The communication engine 1002 may be software or instructions stored on a computer-readable medium that allows the device 1000 to send and receive information over the network 710. The chargeback engine 1004 may be software or instructions stored on a computer-readable medium that is operable to monitor crypto currency ledgers, detect crypto currency transactions, determine chargebacks have been reported, and/or provide any of the other functionality that is discussed above. While the database 1006 has been illustrated as a single database located in the device 1000, one of skill in the art will recognize that it may include multiple databases and be connected to the chargeback engine 1004 through the network 710 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payers and payees;

however, a payer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A distributed crypto currency refund system, comprising:
    a non-transitory memory; and
    one or more hardware processors coupled to the non-transitory memory and configured to read instructions from the non-transitory memory to cause the system to perform operations comprising:
        receiving, through a network from a first device associated with a first user, a refund request associated with a first transaction of a plurality of transactions performed using a crypto currency;
        accessing a distributed crypto currency public ledger comprising records of the plurality of transactions performed using the crypto currency;
        obtaining information associated with the first transaction from the distributed crypto currency public ledger;
        determining, based at least in part on the obtained information, that the first transaction is related to a first payment from the first user to a second user using the crypto currency;
        generating a refund report that references the first transaction in the distributed crypto currency public ledger based on the refund request and the obtained information associated with the first transaction;
        providing the refund report in a first block generated for a distributed refund public ledger separate from the distributed crypto currency public ledger, wherein the distributed refund public ledger is maintained by a distributed network of computing devices;
        processing and broadcasting, through the network to the distributed network of computing devices, the first block that causes the refund report to be published in the distributed refund public ledger;
        providing, on a second device associated with the second user, an interface that presents the refund report and the information associated with the first transaction;
        receiving, through the network from the second device via the interface, a refund response for the refund report;
        providing the refund response in a second block generated for the distributed refund public ledger that is maintained by the distributed network of computing devices; and
        processing and broadcasting, through the network to the distributed network of computing devices, the second block that causes the refund response to be published in the distributed refund public ledger.

2. The system of claim 1, wherein the interface provided on the second device further comprises a selectable element for responding to the refund report.

3. The system of claim 1, wherein the refund response further references a second transaction recorded in the distributed crypto currency public ledger, and wherein the second transaction is related to a refund of an amount associated with the first transaction from the second user to the first user using the crypto currency.

4. The system of claim 1, wherein the refund response includes information associated with a shipment of a product involved in the first transaction.

5. The system of claim 1, wherein the distributed refund public ledger comprises a plurality of refund reports that reference transactions recorded in the distributed crypto currency public ledger.

6. A method for providing distributed crypto currency refunds, comprising:
    receiving, by at least one system provider device through a network from a first device associated with a first user, a refund report that references a first transaction of a plurality of transactions performed using a crypto currency, wherein the first transaction is related to a fund transfer from the first user to a second user using the crypto currency, and wherein the plurality of transactions are recorded in a distributed crypto currency public ledger;
    retrieving, by the at least one system provider device, information associated with the first transaction from the distributed crypto currency public ledger;
    providing, by the at least one system provider device, the refund report in a first block generated for a distributed refund public ledger separate from the distributed crypto currency public ledger, wherein the distributed refund public ledger is maintained by the at least one system provider device along with a distributed network of computing devices;
    processing and broadcasting, by the at least one system provider device through the network to the distributed network of computing devices, the first block that causes the refund report to be published in the distributed refund public ledger;
    providing, by the at least one system provider device on a second device associated with the second user, an interface that presents the refund report and the information associated with the first transaction;
    receiving, by the at least one system provider device from the second device via the interface, a refund response for the refund report;
    providing, by the at least one system provider device, the refund response in a second block generated for the distributed refund public ledger that is maintained by the system provider device along with the distributed network of computing devices; and
    processing and broadcasting, by the at least one system provider device, the second block that causes the refund response to be published in the distributed refund public ledger.

7. The method of claim 6, wherein the interface provided on the second device further comprises a selectable element for responding to the refund report.

8. The method of claim 6, wherein the refund response further references a second transaction recorded in the distributed crypto currency public ledger, and wherein the second transaction is related to a second fund transfer in an amount associated with the first transaction using the crypto currency.

9. The method of claim 8, wherein the second fund transfer related to the second transaction is from a third party different than the second user to the first user.

10. The method of claim 6, wherein the refund response includes information associated with a product or service involved in the first transaction.

11. The method of claim 6, wherein the disturbed refund public ledger comprises a plurality of refund reports that reference transactions recorded in the distributed crypto currency public ledger.

12. A non-transitory machine-readable medium comprising machine-readable instructions executable to cause a machine to perform operations comprising:
   receiving, through a network from a first device associated with a first user, a refund report that references a first transaction of a plurality of transactions performed using a crypto currency, wherein the first transaction is related to a first payment from the first user to a second user using the crypto currency;
   accessing a distributed crypto currency public ledger comprising records of the plurality of transactions performed using the distributed crypto currency;
   obtaining information associated with the first transaction from the distributed crypto currency public ledger;
   providing the refund report in a first block generated for a distributed refund public ledger separate from the distributed crypto currency public ledger, wherein the distributed refund public ledger is maintained by a distributed network of computing devices;
   processing and broadcasting, through the network to the distributed network of computing devices, the first block in order to cause the refund report to be published in the distributed refund public ledger;
   providing, on a second device associated with the second user, an interface that presents the refund report and the information associated with the first transaction;
   receiving, through the network from the second device via the interface, a refund response for the refund report;
   providing the refund response in a second block generated for the distributed refund public ledger that is maintained by the distributed network of computing devices; and
   processing and broadcasting, through the network to the distributed network of computing devices, the second block that causes the refund response to be published in the distributed refund public ledger.

13. The non-transitory machine-readable medium of claim 12, wherein the interface provided on the second device further comprises a selectable element for responding to the refund report.

14. The non-transitory machine-readable medium of claim 12, wherein the refund response further references a second transaction recorded in the distributed crypto currency public ledger, and wherein the second transaction is related to a refund of an amount associated with the first transaction using the distributed crypto currency.

15. The non-transitory machine-readable medium of claim 14, wherein the refund related to the second transaction identifier is conducted by a third party that is different than the second user.

16. The non-transitory machine-readable medium of claim 12, wherein the refund response includes information associated with a shipment of a product involved in the first transaction.

17. The non-transitory machine-readable medium of claim 12, wherein the distributed refund public ledger comprises a plurality of refund reports that reference transactions recorded in the distributed crypto currency public ledger.

18. The non-transitory machine-readable medium of claim 12, wherein the operations further comprise providing, on the first device, a second interface that presents the information associated with the first transaction and a selectable element for initiating the refund report, and wherein the refund report is received via the second interface provided on the first device.

19. The system of claim 3, wherein the operations further comprise:
   receiving, from the second device via the interface, a request for performing the second transaction; and
   causing the second transaction to be published in the distributed crypto currency public ledger.

20. The method of claim 6, further comprising:
   allocating an amount in a refund currency different from the crypto currency to the first user based on the first transaction, wherein the refund report further comprises a third transaction for transferring the amount in the refund currency from the first user to the second user, and wherein the refund response further comprises a fourth transaction for transferring the amount in the refund currency from the second user to the first user.

* * * * *